J. MEEKIN.
WHEEL HUB.
APPLICATION FILED APR. 24, 1919.

1,322,039.	Patented Nov. 18, 1919.

Witness
Thos. W. Riley

Inventor
James Meekin
By W. J. Fitz Gerald & Co.
Attorneys

UNITED STATES PATENT OFFICE.

JAMES MEEKIN, OF HUNTINGTON, INDIANA.

WHEEL-HUB.

1,322,039.  Specification of Letters Patent.  Patented Nov. 18, 1919.

Application filed April 24, 1919. Serial No. 292,496.

*To all whom it may concern:*

Be it known that I, JAMES MEEKIN, a citizen of the United States, residing at Huntington, in the county of Huntington and State of Indiana, have invented certain new and useful Improvements in Wheel-Hubs; and I do hereby declare the following to be a full, clear, and exact description of the invention, such as will enable others skilled in the art to which it appertains to make and use the same.

The present invention relates to wheel hubs, and the primary object of the invention is the provision of a hub for the spokes of a wheel comprising a novel construction and assemblage of the component elements whereby the spokes will be firmly held without the use of bolts, rivets, and the like, as ordinarily used.

It is also the object of the invention to provide a simple and inexpensive hub, the parts of which can be readily assembled, and the construction affording easy separation of the hub and spokes for purpose of replacing broken spokes.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1:
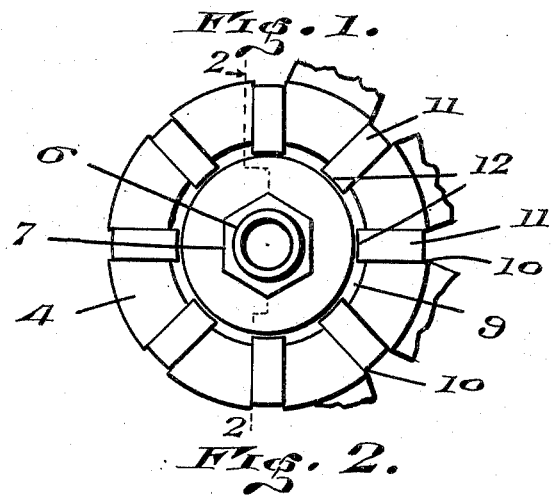
Figure 1 is a side elevation of the improved hub.
Figure 2:
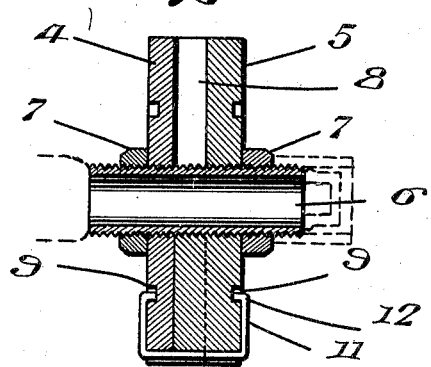
Fig. 2 is a section on the line 2—2 of Fig. 1.
Figure 3:
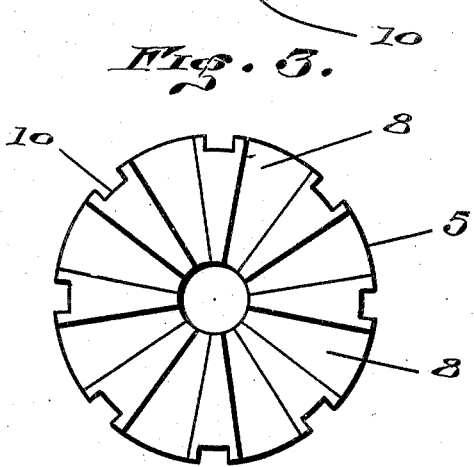
Fig. 3 is an inside view of one of the hub plates.

In carrying out the invention, there is provided a pair of circular hub plates 4 and 5 fitting together side by side, and having central threaded openings threaded onto a boxing or sleeve 6, and nuts 7 are threaded on said boxing at the opposite sides of the plates for clamping them together at the center. The plate 5 is thicker than the plate 4 and is provided at its inner side with radial recesses 8 to receive the inner ends of the spokes and snugly hold them in place.

The hub thus constructed performs all of the functions of the ordinary hub, and the boxing 6 can then be mounted as usual on the axle or spindle.

The stability of the hub is further secured by the provision of annular grooves 9 in the opposite or outer sides of the disks 4 and 5 and registering notches 10 in the edges of the disks in which U-shaped springs clips 11 are disposed. These clips straddle the elge portions of the disks with the intermediate portions of the clips seated in the notches 10, and the ends of the clips extend inwardly and are bent, as at 12, so as to engage within the grooves 9, thus holding the clips on the plates. Said clips will hold the plates together at the edges, and the parts can be readily assembled as well as taken apart. By springing the clips 11 out of the grooves 9, they can be withdrawn from the plates, and the nuts 7 and plates can then be unscrewed from the boxing 6. This provides for the convenient replacement of broken spokes, and provides for other advantages.

Having thus described the invention, what is claimed as new is:—

1. A wheel hub comprising a pair of plates having means for receiving spokes between them, and U-shaped clips straddling the edge portions of said plates, the edges of the plates having means receiving said clips for holding them in position, and the opposite sides of the plates having means for receiving the ends of the clips for holding them over the edge portions of the plates.

2. A wheel hub embodying a pair of plates having means for receiving spokes therebetween, and U-shaped clips straddling the edge portions of the plates, said plates having notches in their edges receiving said clips, and annular grooves in their opposite sides, the ends of the clips engaging in said grooves.

3. A wheel hub comprising a boxing, a pair of plates thereon having means for receiving spokes therebetween, nuts threaded on the boxing for clamping the plates thereon, said plates having annular grooves in their opposite sides and notches in their edges, and U-shaped clips straddling the edge portions of said plates and seated in said notches, the ends of said clips engaging in said grooves.

In testimony whereof I have signed my name to this specification in the presence of two subscribing witnesses.

JAMES MEEKIN.

Witnesses:
CLAUDE CLINE,
TERE A. CLARK.